United States Patent [19]

Okamoto

[11] 4,075,402

[45] Feb. 21, 1978

[54] APPARATUS FOR HOLDING BATTERY

[76] Inventor: Shinobu Okamoto, 1-4-3, Yahata-cho, Koyama, Tochigi, Japan

[21] Appl. No.: 709,187

[22] Filed: July 27, 1976

[30] Foreign Application Priority Data

Jan. 22, 1976 Japan .................................. 51-5155[U]

[51] Int. Cl.² ................................................ H01M 2/10
[52] U.S. Cl. ........................................ 429/98; 339/152
[58] Field of Search ........................ 429/96, 98, 99, 100, 429/121, 97; 320/3, 4, 2; 174/176, 177; 318/139; 325/492, 16, 118, 119; 339/64 R, 119 R, 152, 217 S, 217 TP, 258 A, 47 R, 49 R, 185

[56] References Cited

U.S. PATENT DOCUMENTS

| 3,105,938 | 10/1963 | Onnigian et al. ..................... 325/119 |
| 3,154,653 | 4/1939 | Anketell .................................. 429/97 |
| 3,209,230 | 9/1965 | Mas .......................................... 320/4 |
| 3,855,534 | 12/1974 | Holcomb ............................. 325/492 |
| 3,957,540 | 5/1976 | Mabuchi et al. .................. 339/119 R |

Primary Examiner—Donald L. Walton
Attorney, Agent, or Firm—Lane, Aitken, Dunner & Ziems

[57] ABSTRACT

An improved structural arrangement for holding a battery having male and female terminals within the battery compartment of a portable electrical appliance includes two plate springs each connected at one end to the appliance circuitry and carrying, at the other end, one of the circuitry terminals for engagement with the corresponding battery terminal. The terminals of the battery are brought into engagement with the circuitry terminals simply by inserting the battery into the battery compartment against the elastic force of the plate springs. After engagement of the circuitry terminals with the battery terminals, the battery is held securely in place by the elastic force of the plate springs and contact between the mating terminals is likewise secured.

2 Claims, 3 Drawing Figures

FIG. I
PRIOR ART
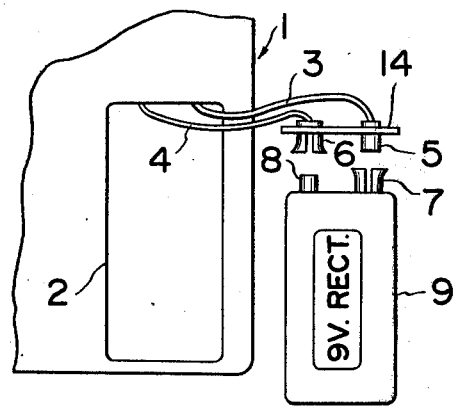
FIG. 2A
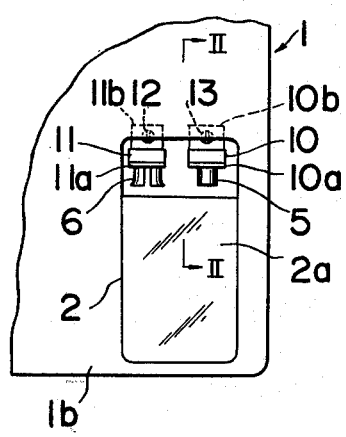
FIG. 2B
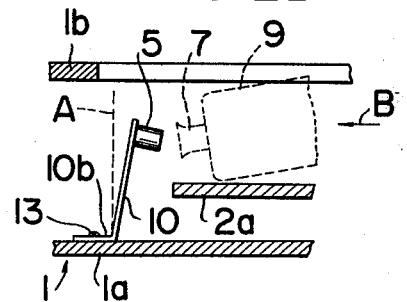

APPARATUS FOR HOLDING BATTERY

BACKGROUND OF THE INVENTION

This invention relates to an apparatus for holding a battery, particularly to an apparatus for holding a battery in a portable electric appliance such as a magnetic tape recorder/player. The term "battery", as used herein, contemplates both a dry or primary battery and a storage or secondary battery.

In a portable electrical appliance such as a magnetic tape recorder/player, for example, a dry battery of a type called "9V. RECT." is ordinarily used as the power source. This battery, indicated by numeral 9 in FIG. 1, has on its top, a male positive terminal 8 in the form of a metal cylinder or rod and a female negative terminal 7 consisting of a plurality of elastic metal pieces arranged annularly to form a socket.

One prior art device for holding such a battery, is shown in FIG. 1, wherein the numeral 1 designates the main body of an electric instrument such as a portable cassette-tape magnetic recorder/player provided with a generally box-shaped chamber or battery compartment 2 for receiving the battery 9. Two flexible insulated lead wires 3 and 4, are connected to the electric conduit housed in the body 1 and are of a relatively long length so that they may be drawn out of the chamber 2 to a certain extent. Wires 3 and 4 are provided with terminals 5 and 6 for connection with the battery 9. The terminals 5 and 6 are fixed to a plastic plate 14 in a spaced relationship for engagement with the terminals 7 and 8 of the battery 9. Terminal 5 is a male terminal consisting of a metal cylinder or rod, and terminal 6 is a female terminal consisting of a plurality of elastic metal pieces annularly arranged to form a socket. To connect the battery 9, battery terminals 8 and 7 are press-fitted to the lead wire terminals 6 and 5, respectively. Then, the battery 9, together with the plastic plate 14 carrying the lead wire terminals 5 and 6 is placed into the chamber 2. In placing the battery 9 in the chamber 2, the lead wires 3 and 4 must be bent or folded so that they will fit in the space remaining in the chamber 2 after the battery 9 has been inserted. Several problems are inherent in the prior art apparatus including: (1) difficulty of replacing the battery; (2) likelihood of breakage of the lead wires due to repeated bending and folding; and (3) possibility of poor contact between the lead wire terminals and the battery terminals resulting from a loose fitting.

SUMMARY OF THE INVENTION

The above described drawbacks of the prior art device have been successfully overcome by the present invention.

According to the present invention, the compartment for receiving the battery is provided with resilient means rigidly secured at an end portion to the main body. In the preferred embodiment the resilient means consists of two elongated leaf springs which carry at their free end portions the terminals of the appliance circuitry. These circuitry terminals are electrically isolated from each other and are arranged so as to elastically engage the respective terminals of a battery.

Accordingly, an object of the present invention is to provide an improved apparatus for holding a battery, wherein resilient means mounted in an electric appliance carry the circuit terminals in a manner whereby they are elastically pressed against the terminals of a battery which is inserted into the battery compartment of the appliance.

Another object of the invention is to provide for a secure fit for the battery within the battery compartment.

A further object of the invention is to provide for a secure electrical contact between male and female type terminals, even if the female terminal has become distended.

A still further object of the invention is to provide an apparatus for holding a battery, wherein the above-mentioned resilient means consists of two electrically isolated plate springs.

The above and other objects and advantages of the invention will be apparent from the following description of a preferred embodiment taken in connection with the accompanying drawings.

BRIEF DESCRIPTION OF THE DRAWINGS

FIG. 1 is a schematic view of the prior art battery connection;

FIG. 2A is a partial plan view illustrating a battery compartment in accordance with the present invention; and FIG. 2B is a partial sectional view taken on line II—II of FIG. 2A.

DETAILED DESCRIPTION OF THE PREFERRED EMBODIMENT

FIGS. 2A and 2B illustrate one embodiment of the present invention. Similar numerals indicate like parts as in FIG. 1 and accordingly a detailed description of the common features has been omitted. Metallic plate springs 11 and 10 are fixed respectively by screws 12 and 13 to the bottom 1a of an insulated main body or housing 1. The free end portions 10a and 11a of the respective plate springs 10 and 11, protrude into the battery chamber 2 and carry, respectively, a male terminal 5 and a female terminal 6 both made of metal.

Details of the plate spring 10 are illustrated in FIG. 2B. The lower end portion of the plate 10 opposite to the free end 10a is formed into a bent portion 10b which is fixed to the bottom 1a of the housing 1 by screw 13. The plate spring 11 (FIG. 2A) has a similar construction, i.e. a lower bent portion 11b fixed to the housing 1 by screw 12. At an intermediate position between the bottom 1a and the top face 1b of the housing 1 is provided a deck 2a which serves as a guide for a battery 9 indicated by the dotted line.

To place the battery into the housing, the top portion of the battery 9 carrying the terminals is inserted into the battery compartment 2 first along the deck 2a in the direction of arrow B, and thus the female terminal 7 of the battery engages the male terminal 5, and the female terminal 6 (FIG. 2A) engages the male terminal (not shown) of the battery. As the battery 9 is pushed into the battery compartment 2 in the direction of arrow B against the elastic force of the plate springs 10 and 11, the plate springs 10 and 11 are deflected to the position indicated by dotted line A.

The end portions 10b and 11b of the plate springs 10 and 11 are electrically connected to an electric circuit in the main body 1 of the apparatus to supply electricity to the circuit from the battery 9.

As will be understood from the foregoing description, the apparatus of the present invention offers advantages whereby the previously mentioned drawbacks associated with the prior art apparatus are successfully eliminated. With the present invention, the battery 9 can be placed in operative readiness within the main body 1 by simply inserting the battery 9 into the compartment 2 and pushing it toward the terminals 5 and 6 against the elastic force of the plate springs 10 and 11. Thus the need for long lead wires within the battery compartment is eliminated. The plate springs 10 and 11, with their elastic force, press the circuit terminals 5 and 6 against the terminals of the battery 9, thus maintaining sure contact even if the fit between the mating terminals becomes loose. Further, the plate springs 10 and 11 serve to elastically press the battery 9 against the side wall of the compartment 2, thus securely holding the battery. Accordingly, even at the time when the electrical apparatus is carried about or otherwise jarred contact between the circuit terminals 5 and 6 and the terminals of the battery will remain unbroken.

While the foregoing description has been limited to the preferred embodiment of the invention, it should be understood that various changes and modifications can be made without departing from the spirit and scope of the invention.

I claim:

1. An improvement for an electrical apparatus for holding a battery which includes a pair of male and female terminals at one end thereof, the apparatus being of the type comprising a main body which includes a compartment therein for receiving the battery and a pair of female and male circuit terminals extending into the compartment and arranged for engagement with the respective male and female terminals of the battery, the improvement comprising: first and second resilient, electrically conductive, plate springs rigidly secured at their end portions to the main body and extending into and terminating in the battery compartment, one of said plate springs carrying at its free end portion the female circuit terminal for engagement with the battery male terminal and the other of said plate springs carrying at its free end portion the male circuit terminal for engagement with the battery female terminal, said first and second plate springs being electrically isolated from each other, the compartment being sized so that when the battery terminals on one end of the battery are engaged by the plate springs the other end of the battery will engage a surface of the compartment opposite said plate springs.

2. The improvement in claim 1, wherein the plate springs are L-shaped, one portion of the "L" being connected to the main body and the other portion containing the terminal.

* * * * *

UNITED STATES PATENT AND TRADEMARK OFFICE
CERTIFICATE OF CORRECTION

PATENT NO. : 4,075,402
DATED : February 21, 1978
INVENTOR(S) : SHINOBU OKAMOTO

It is certified that error appears in the above-identified patent and that said Letters Patent are hereby corrected as shown below:

Col. 1, line 26, "conduit" should read -- circuit --.

Signed and Sealed this

Eleventh Day of July 1978

[SEAL]

Attest:

RUTH C. MASON
Attesting Officer

DONALD W. BANNER
Commissioner of Patents and Trademarks